Feb. 23, 1926.
C. W. KIRSCH
1,574,397
METAL FORMING MACHINE
Filed August 9, 1923
5 Sheets-Sheet 1
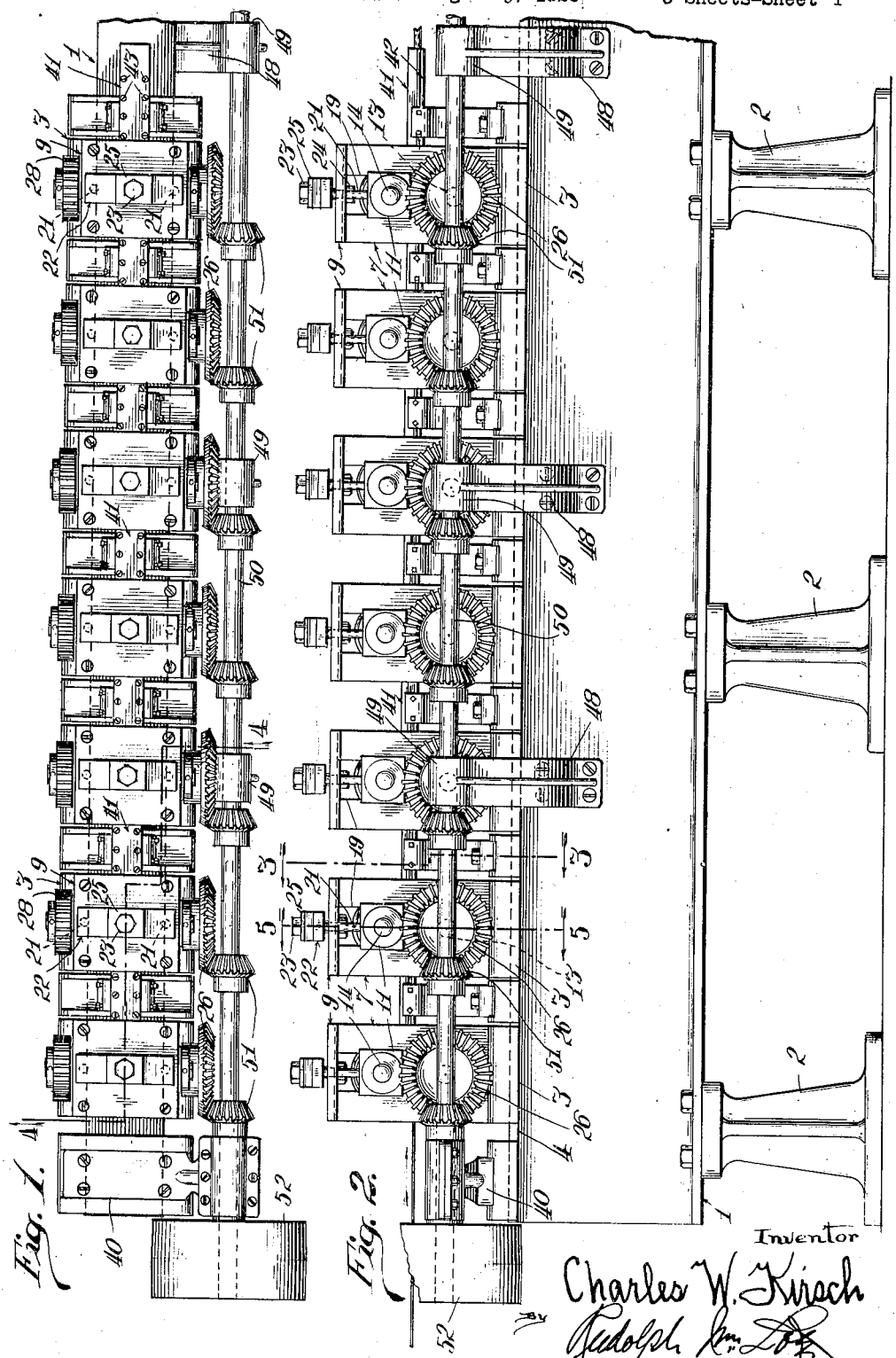
Inventor
Charles W. Kirsch
Attorney.

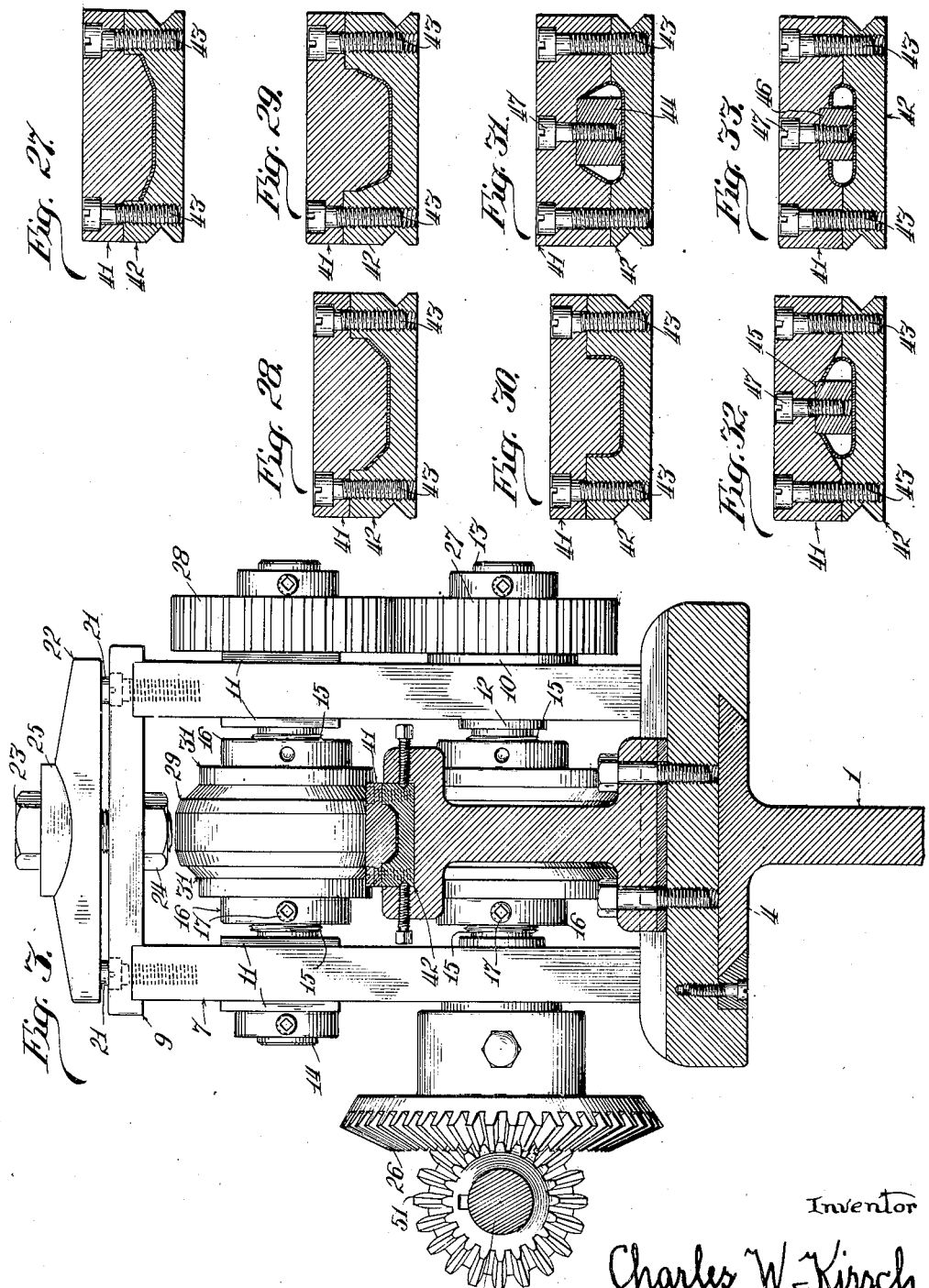

Feb. 23, 1926. 1,574,397
C. W. KIRSCH
METAL FORMING MACHINE
Filed August 9, 1923 5 Sheets-Sheet 3
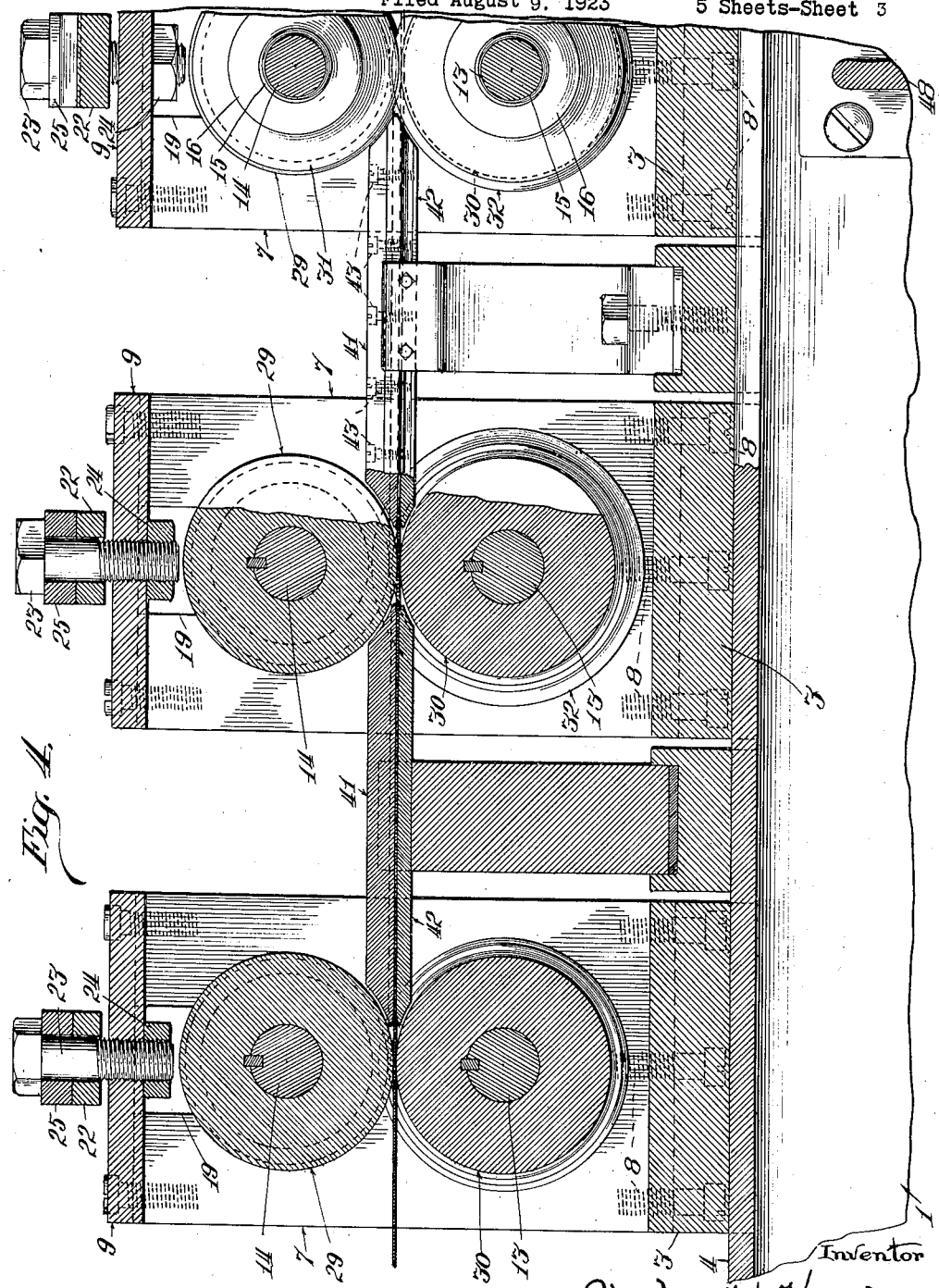

Feb. 23, 1926.
C. W. KIRSCH
METAL FORMING MACHINE
Filed August 9, 1923
1,574,397
5 Sheets-Sheet 4
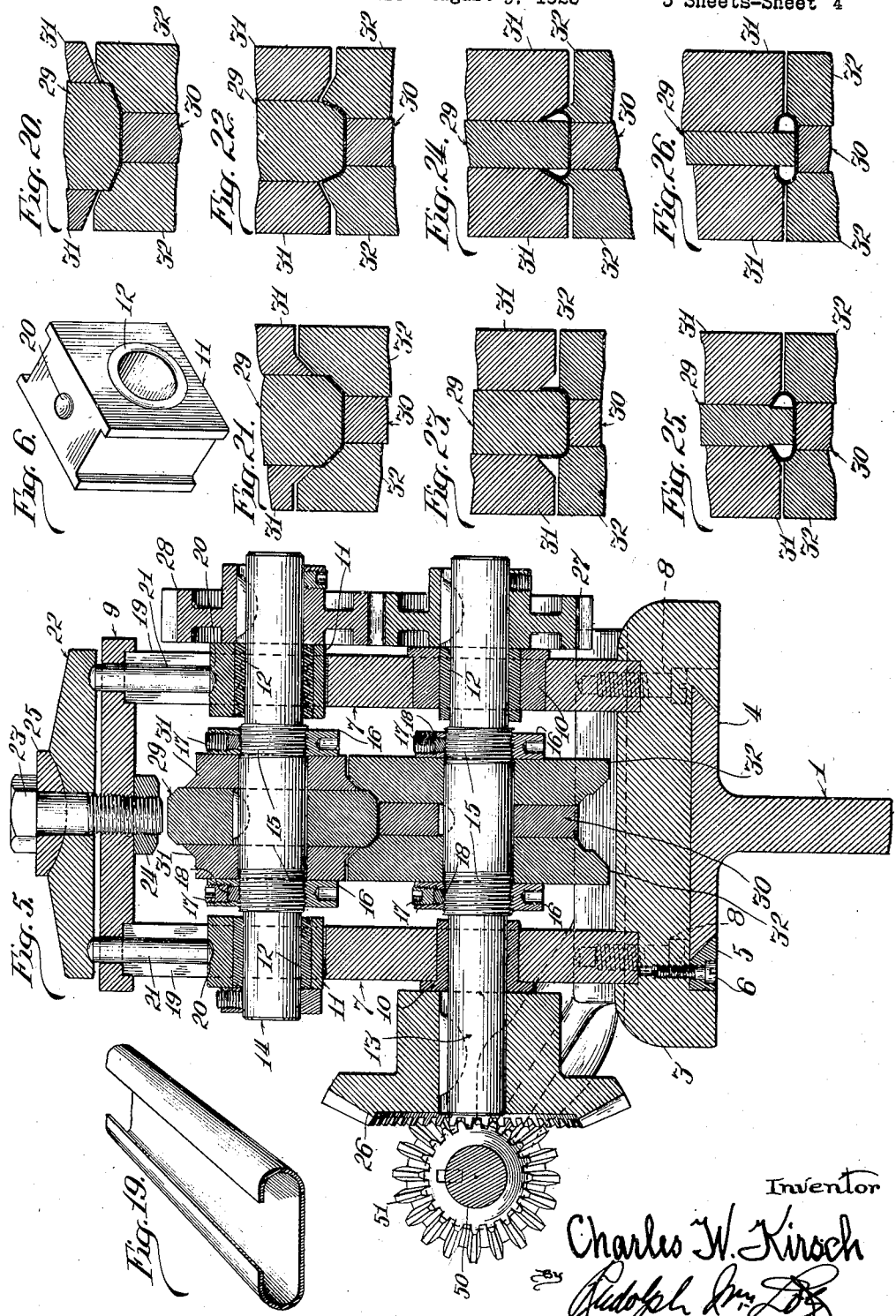

Feb. 23, 1926.

C. W. KIRSCH

METAL FORMING MACHINE

Filed August 9, 1923     5 Sheets-Sheet 5

1,574,397

Inventor
Charles W. Kirsch
By Rudolph Wm. Lotz
Attorney.

Patented Feb. 23, 1926.

1,574,397

UNITED STATES PATENT OFFICE.

CHARLES W. KIRSCH, OF STURGIS, MICHIGAN, ASSIGNOR TO KIRSCH MANUFACTURING COMPANY, OF STURGIS, MICHIGAN, A CORPORATION OF MICHIGAN.

METAL-FORMING MACHINE.

Application filed August 9, 1923. Serial No. 656,560.

*To all whom it may concern:*

Be it known that I, CHARLES W. KIRSCH, a citizen of the United States, and a resident of Sturgis, St. Joseph County, Michigan, have invented certain new and useful Improvements in and for Metal-Forming Machines, of which the following is a specification.

This invention relates to machines for bending and forming flat strips of metal into any desired cross-sectional shape or shapes and has for its particular object to provide means whereby such bending is easily and quickly accomplished to produce strips as aforesaid which are delivered perfectly straight from the delivery end of the machine.

One of the main objects of the invention is to provide a machine of the character set forth wherein the bending elements each consists of a plurality of independently rotatable elements whereby certain outset elements turned idle are actuated by contact with the surface of the metal strip acted upon to be bent thereby.

A further object of the invention is to provide a machine of the character specified wherein the bending elements are relatively arranged so as to automatically compensate for slight differences in thicknesses of the metal strips bent thereby.

A still further object of the invention is to provide a machine of the kind specified wherein the number of bending elements is capable of being easily changed and varied to accord with the needs of the particular shape to which the strip is to be bent and wherein the several bending elements are readily interchangeable.

Other objects of the invention will be fully understood from the following specification.

In the accompanying drawings, illustrating a suitable embodiment of the invention:

Fig. 1 is a top plan view, partly broken away, of a machine constructed in accordance with the invention.

Fig. 2 is a side elevation of the same.

Fig 3 is a vertical transverse section of the same on the line 3—3 of Fig. 2.

Fig. 4 is a fragmentary detail longitudinal section of the same on the line 4—4 of Fig. 1.

Fig. 5 is a vertical transverse section of the same on the line 5—5 of Fig. 2.

Fig. 6 is a detail perspective view of one of the bearings for the shafts of the bending rolls.

Figs. 8 to 18 inclusive are fragmentary detail vertical transverse sections of the several pairs of bending rolls employed showing the substantially opposed circumferential surface portions thereof between which the strip of metal is engaged and fed longitudinally through the machine simultaneously with being formed or bent as aforesaid.

Figure 7:
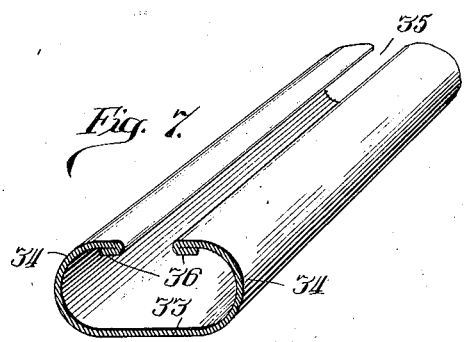
Fig. 7 is a perspective view, partly in cross-section, of an examplary shape to which a flat strip of metal is adapted to be bent.

Fig. 19 is a view similar to Fig. 7 showing another form to which the metal strip is adapted to be bent.

Figs. 20 to 26, inclusive, are fragmentary detail sectional views similar to Figs. 8 to 18 inclusive, showing the rollers for producing the former strip illustrated in Fig. 19.

Figs. 27 to 33, inclusive are detail views in cross-section of guides preferably employed to alternate with the several pairs or sets of bending rolls for officially guiding the strip during passage through the machine, the guides herein illustrated being particularly applicable to the former strip shown in Fig. 19.

The primary object of the machine is to bend flat strips of metal into a cross-sectional shape or shapes adapting them for use as curtain rods of the type particularly illustrated, for example, in Letters Patent to C. W. Kirsch No. 1,187,914, but may obviously be modified to produce strips of similar or other cross-sectional shapes adapted for various purposes.

The machine comprises a main element 1 which consists preferably of an ordinary steel I-beam of suitable dimensions properly machined to the extent necessary to provide an accurate plane top flange surface and such other surface portions as will adapt the same for use for the purpose set forth. Said I-beam is suitably supported upon supporting elements or bases 2 bolted or otherwise secured thereto.

Mounted upon the top flange of said I-beam in properly spaced relation relatively to each other are a plurality of housings for the several sets of bending rolls employed, exemplary sets being illustrated in detail particularly in Fig. 5. Each of said housings comprises a base plate 3 provided in its lower face with a longitudinal recess adapted to receive the top flange 4 of the I-beam 1, said flange being provided with bevelled side edges adapted to be engaged by the shoes 5 mounted in the side portions of the recess in the plate 2 and adapted to be adjusted by means of the screws 6 to clamp the said base plate upon said flange 4. In its upper face said base plate is provided with longitudinal grooves to receive the lower edges of the side plates 7 of the housings which are held therein by means of the set screws 8. At their upper edges said side plate 7 enter longitudinal grooves in a top plate 9 similarly secured by means of set screws.

Mounted in the side plates are two pairs of bearings 10 and 11, respectively, each of which is equipped with suitable bushings 12 which receive the shafts 13 and 14 respectively. Each of the latter has reduced end portions and larger middle portions, the ends of the middle portions being threaded as at 15 to receive the adjustable collars 16 adapted to be held rigidly in any position to which they may be adjusted by means of the set screws 17 and clamping members 18. The bearings 11 for the shaft 14 are vertically adjustable in vertical slots 19 extending inwardly from the upper edges of the side plates 7. They are provided in their top faces with recesses 20 to receive the pins 21 which project through openings in the top plate 9 and engage in recesses in the lower face of the yoke 22 which is held in place to bear upon said pins 21 by means of the bolt 23 and nut 24, the latter engaging the lower face of the top plate 9 through which the threaded end portion of the nut 23 passes. Disposed between the head of said nut 23 and the yoke 22 is a collar 25 having a sphero-convex lower face in a similarly shaped recess in the yoke bordering the opening through which the shank of the bolt 23 passes. The yoke 22 is thus enabled to rock on said collar 25 as a fulcrum and in adjusting the same with relation to the top plate 9 of the housing a very slight play is permitted whereby said bearings 11 are permitted to move slightly in their guide recesses to compensate for variations in the thickness of the metal strips passed through the machine.

Each of the shafts 13 is provided at one end with a bevel gear 26, suitably keyed thereto and at its other end with a spur pinion 27 also keyed thereon. The latter meshes with a companion spur pinion 28 of the same pitched diameter as the pinion 27 which is keyed upon one end of the shaft 14, the shafts 13 and 14 being thus adapted to be driven to rotate in unison.

Mounted upon the middle or enlarged portion of each of the shafts 13 and 14, between the threaded portions thereof, are the bending rolls, each of which consists of three parts or elements, the middle one 29 and 30, respectively, of which is keyed upon its shaft so as to rotate in unison therewith and the two outer elements 31 and 32, respectively arranged in pairs, are idle on said shafts and are held by the adjustable collars 16 in such close relation to the middle members as to maintain them properly positioned to perform their respective functions without, however, interfering with their free rotation relatively to said middle members.

While the compression springs may be employed to bear at opposite ends upon the bearings for the shafts 14 and the top plate 9, it has not been found necessary in practice to employ such springs if the yokes 22 are properly adjusted. However, the use of such springs is very common in the art of metal rolling and may be supplied if desired.

It will be understood, of course, that the various sets of bending rolls are of different cross-sectional shapes to successfully bend the strip of metal gradually to the desired form. It is essential, however, that the extreme diameters of the opposed middle members of each set be identical for the reason that said middle members constitute the driving elements for affecting travel of the strip through the machine without effecting a bending or curling thereof longitudinally, certain of said middle members presenting peripheral corner portions coacting with the side idle rolls of the companion set to effect bending of the metal. This is common to practically all of the middle members of the upper set of rolls.

The bending is accomplished by a series of successive steps and with reference to the particular cross-sectional shape shown in Fig. 7 the operations will be as follows:

It will be noted that said strip consists of a flat or plane middle portion 33 and curved side flanges 34, the edges of which are opposed to each other and spaced apart to provide a longitudinal slot 35, the extreme edge portions of the flanges 34 being folded over upon each other by providing a flat narrow flange 36 bent over inwardly upon the same.

Figure 8:
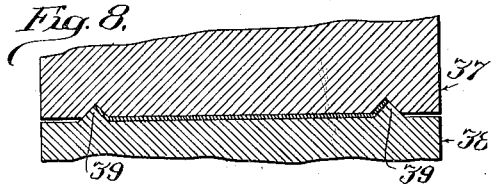
Figure 9:
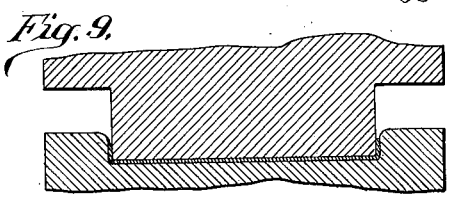
Figure 10:
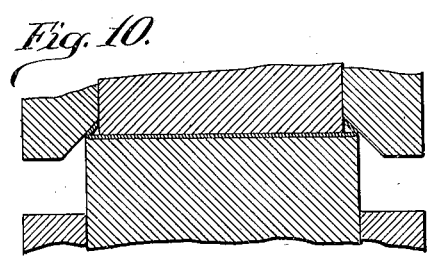
Figure 11:
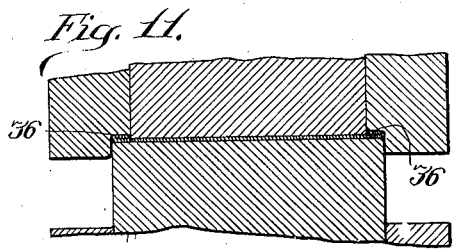
Figure 12:
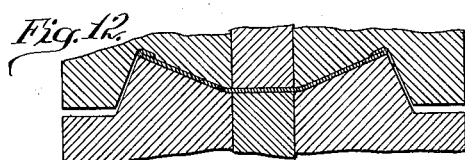
Figure 13:
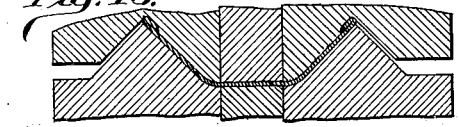
Figure 14:
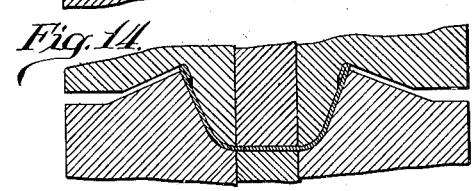

Consequently in the production of this particular cross-sectional shape the flat strip will, as illustrated in Fig. 8, be first subjected to the action of a pair of companion rolls 37 and 38, the former of which is provided with V-shaped peripheral grooves and the latter with a similar peripheral formation 39 so arranged that the outer bevelled faces of said formation will bear upon the opposed or outer bevelled face of the companion recess, and a space equal or substantially equal to the thickness of the strip will be provided between the other opposed faces of said formations and recesses and similarly between the cylindrical peripheral faces of said rolls 37 and 38. Thus as the strip passes between said rolls the extreme side edge portions will be bent to extend at an angle of substantially forty-five degrees to the main portion thereof and by successive steps as illustrated in Figs. 9, 10 and 11, respectively, said flanges will be folded over to lie flatly upon the upper face of the strip. The first two bending operations, as illustrated in Figs. 8 and 9, are accomplished by the use of only two pairs of rolls as distinguished from the two sets of three rolls each thereafter employed in the further bending or forming operations with relation to this particular shape, as illustrated in Figs. 10 to 15 inclusive. The folding over of the edges of the strip as illustrated in Figs. 8 to 11 inclusive can be accomplished only with a very ductile metal, such as soft brass or the like and where such edges are folded over it will be obvious that each of the succeeding set of bending rolls must be provided with surface grooves adapted to receive said folded edge portions of the strip. Reference to Figs. 12 to 18 inclusive, will sufficiently illustrate the further successive operations employed to produce the cross-sectional shaped strip shown in Fig. 7, the final step in the production thereof consisting in passing said strip through a straightening device 40 at the delivery end of the machine which is of ordinary construction commonly used in the art and is therefore not illustrated in detail.

Preferably and in some instances necessarily, the successive steps of bending rolls are alternated with guide devices such as are illustrated in Figs. 27 to 33, inclusive, each of which consists of two opposed guide blocks 41 and 42 held in relative position and secured together by means of the set screws 43, the opposed middle face portions thereof being respectively and successively shaped to correspond with that shape which is imparted to the metal strip by the next preceding set of rolls, said guide being illustrated in Fig. 4 of such length as to extend between points as nearly as possible proximate to the vertical plane intersecting the axes of the shafts 13 and 14 of each set of rolls. While the guide elements herein illustrated are particularly applicable to the production of that shape of strip shown in Fig. 19 it will be readily understood that the same may be easily modified to adapt the same for the particular shape of strip illustrated in Fig. 7 by merely providing space for the reception of the edge flanges 36.

By referring to Figs. 31, 32 and 33 it will be noted that these guides may be provided with additional elements 44, 45 and 46, respectively, mounted upon the upper guide member by means of the set screws 47 for co-acting with the lower guide member to maintain the middle portion of the strip flat while providing guide openings for the flanges after the same have been first partially bent to converge and until they have attained their final opposed relation as illustrated in Fig. 33.

Mounted upon the web of the I-beam 1 are a plurality of brackets 48 which at their upper ends are equipped with bearings 49 for the shaft 50 which extends longitudinally of and parallel with the I-beam and is provided at proper intervals with bevelled pinions 51 adapted to mesh with the bevel gears 26 of the several shafts 13 for driving the latter and the several sets of bending rolls as hereinbefore particularly pointed out. Said shaft 50 is herein shown as equipped at one end with a pulley 52 for driving the same but obviously any other driving means may be substituted.

It will be noted that the construction illustrated and described permits quick assembly of a complete machine for producing any desired shape and style or size of strip by merely replacing one set of housings containing the requisite sets of bending rolls for others to thereby associate any number of said sets of bending rolls and the guides therefor to produce such strip.

It will be observed that by employing one pair of drive rolls, or feed-rolls, in each set in association with two pairs of idle rolls, the latter are driven entirely by contact with the metal strip and may rotate at such relative speeds as the strip itself effects by the speed of its travel through the machine. In this way there is no strain or stress placed upon the metal strip such as would result from the use of driving elements in place of the idle elements when providing accurate means for rotating the proposed pairs of bending rolls at exactly the right proportionate speeds. The strips consequently leave the machine without being curled or distorted to any appreciable extent and the metal is not scored so that the final straightening operation is merely one of eliminating the slight bow of the strip apt to be imparted thereto by the pressure exerted thereon by the opposed pairs of driving metal members of the several sets.

Figure 15:
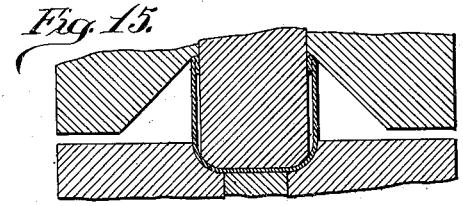
Figure 16:
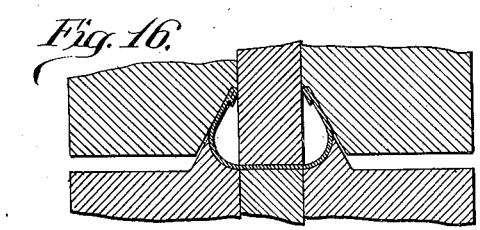
Figure 17:
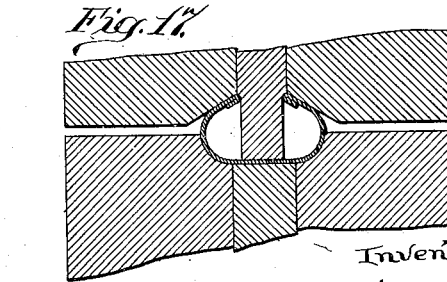
Figure 18:
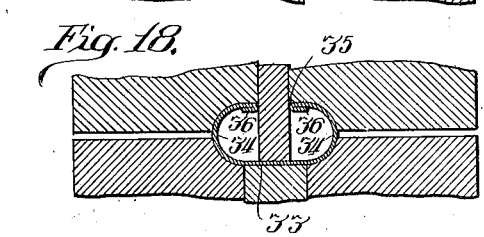

Referring to Figs. 12 to 18 inclusive, it will be noted that the central feed-rolls, both of which preferably are positively driven, serve at all times to grip the medial longitudinal portion of the strip and effect positive forward feed of the strip; also, that the idle rolls which flank the central feed-rolls serve to bend the lateral margins of the strip upwardly, gradationally, until, as shown in Fig. 15, wings are formed which stand substantially at right angles to the central portion of the strip, while said central portion is gripped by the feed-rolls; that the upper feed-roll, from this point forward, becomes successively of less thickness, while the upper idlers perform the function of bending the wings inwardly and finally causing them, as shown in Fig. 18, to assume a position substantially parallel with the intermediate portion of the strip which is driven by the feed-rolls. It will be noted that the idlers have their walls cut away or relieved to afford the necessary space to permit the bending to occur and enable the strip to assume finally the oval cross-sectional form shown in Fig. 18.

By reference to Figs. 20 to 26, inclusive, it will be noted that the same general plan of effecting the bending of the strip is employed. In the illustration given in these figures, however, the initial bending of the lateral margins of the strip to form the wings is effected by co-action between the two lower idlers and the upper feed-roll, which, for the purpose, is made wide, the upper idlers being correspondingly reduced in thickness. This is particularly illustrated in Figs. 20 to 22, inclusive; and taking Figs. 20 to 26 as a group, it will be noted that there is a successive reduction in the thickness of the upper feed-roll. As shown in Figs. 23 to 26, inclusive, the upper idlers come into play to bend the wings to the upright position and then to bend them into a position parallel with the central portion of the strip which is gripped by the central feed-rolls, as illustrated in Fig. 26.

While I have illustrated and described the preferred embodiments of the invention in the drawings and foregoing description, and have limited such illustration and description to the particular cross-sectional shapes of strips illustrated in Figs. 7 to 19, respectively, it will be understood, of course, that the particular embodiment may be changed and varied in details of construction and mode of assembly and with reference to various cross-sectional shapes desired to be imparted to metal strips without departing from the invention as defined in the appended claims.

I claim as my invention:

1. In a machine of the kind specified, a plurality of pairs of strip bending and forming elements between which a strip of sheet metal is adapted to be successively passed, each of said pairs of elements including a middle driven roll having a cylindrical face, all of said driven rolls being of equal diameter and adapted to effect forced travel of the strip while maintaining the portion thereof engaged by said rolls in normal condition, a pair of idle rolls associated with each driven roll and axially aligned therewith for bending the side edge portions of the strip and adapted to be rotated relatively to the driven roll by contact with the strip, and guides associated with and disposed between successive pairs of bending elements for guiding the strip from each pair of said elements to the next thereof, each of said guides having a guide opening corresponding in contour and cross-sectional dimensions with that of the strip as the same is delivered from the pair of bending elements behind each of said guides.

2. In a machine of the character set forth, the combination of a series of sets of feeding and bending rolls adapted to form a strip into an open-sided tubular member, each set of rolls comprising a pair of central feed-rolls adapted to grip the medial longitudinal portion of the strip and positively feed the strip forward, and two pairs of idle rolls flanking the set of feed-rolls, said idle rolls being adapted to bend the wings of the strip successively inwardly to a position substantially parallel with the central portion of the strip, while the central portion of the strip is held within the grip of the feed-rolls.

3. In a machine of the character set forth, the combination of a series of sets of feeding and bending rolls, comprising: rolls for gripping the longitudinal medial portion of the strip and positively feeding the strip forward and effecting initial bending of the lateral margins of the strip to form wings at an angle to the medial portion of the strip; and a succeeding series of sets of feeding and bending rolls, each set comprising a central pair of feed-rolls adapted to grip the medial longitudinal portion of the strip and positively feed the strip forwardly, and pairs of idle rolls flanking the pair of feed-rolls and provided with means for bending the wings of the strip inwardly, and idle rolls being adapted to effect the inward bending of said wings, by gradations, and finally bring them to a position substantially parallel with the medial portion of the strip, and the upper feed-rolls being of successively reduced thickness and co-acting with the lower feed-rolls to grip the medial portion of the strip and positively feed the strip forwardly while the wings are being thus bent to position by the additional rolls.

4. In a machine of the character set forth, the combination with means for initially bending the lateral margins of a strip to an inclined position with respect to the medial longitudinal portion of the strip, of a series of sets of feeding and bending rolls, each set comprising a central pair of feed rolls adapted to grip the intermediate portion of the strip and effect positive forward feed of the strip, and pairs of idle rolls flanking the pair of feed-rolls, the idle rolls of the first set being adapted to bend the wings of the strip to a position substantially perpendicular to the medial portion of the strip, and the idle rolls of the succeeding sets being adapted to bend said wings inwardly, by gradations, and finally bring them to a position substantially parallel with the medial portion of the strip, while the feed-rolls serve to grip the medial portion of the strip and positively feed the strip forwardly.

5. In a machine of the character set forth, the combination of a series of sets of feeding and forming rolls, each set comprising a central pair of feed-rolls adapted to grip the longitudinal medial portion of a channeled strip and positively feed the strip forwardly, one member of each set of feed-rolls being successively reduced in thickness towards the final end of the series; and pairs of idle rolls flanking each set of feed-rolls and adapted to bend the wings of the channel strip inwardly, by gradations, and finally bring them into position substantially parallel with the medial portion of the strip, while the medial portion of the strip continues under the feeding action of the central feed-rolls.

6. In a machine of the character set forth, the combination of a series of sets of feeding and bending rolls adapted to form a strip into an open-sided tube, comprising: a series of sets of feeding and bending rolls, each set consisting of a central pair of feed-rolls adapted to grip the medial portion of the strip and positively feed the strip forward, and pairs of flanking idle rolls, said idle rolls being adapted to bend the lateral margins of the strip, by gradations, and bring them to position approaching a perpendicular with respect to the medial portion of the strip; and a succeeding series of sets of feeding and bending rolls, each set comprising a central pair of feed-rolls adapted to grip the central portion of the strip and positively feed the strip forwardly, and pairs of idle rolls flanking the pair of feed-rolls, the idle rolls of the series being adapted to bend the wings inwardly, by gradations, and bring them finally to position substantially parallel with the central portion of the strip, while the central portion of the strip continues within the gripping and feeding action of the central pairs of feed-rolls.

7. In a machine of the character set forth, the combination of a bed-plate, a plurality of housings adjustably fixed in spaced relation on said bed-plate, and a set of feeding and bending rolls mounted in each of said housings, each set including a pair of shafts, a central pair of feed-rolls fixedly mounted on said shafts, and pairs of idle rolls flanking said feed-rolls and freely mounted on said shafts, means for actuating said shafts, and independent yieldingly held bearings for one shaft of each set, permitting the feed-rolls and idle rolls of each set to accommodate themselves to varying thicknesses of metal.

8. In a machine of the character set forth, the combination of a bed-plate provided with a continuous guide, a plurality of housings mounted on said guide, means for securing said housings in adjusted spaced relation on said bed-plate, and a set of feeding and bending rolls mounted in each housing, each set comprising a pair of positively driven central feed-rolls and pairs of idle rolls flanking said pair of feed-rolls.

9. In a machine of the character set forth, the combination of a bed-plate provided with a continuous guide, a plurality of housings adapted to said guide, means for securing said housings in adjusted spaced relation on said bed-plate, and a set of feeding and bending rolls mounted in each housing, each set comprising a pair of positively driven central feed-rolls, pairs of idle rolls flanking said pair of feed-rolls, and guides mounted on said bed-plate between said sets of rolls, each guide having a channel adapted to receive the strip from one set of rolls and conduct it to the succeeding set of rolls.

In testimony whereof, I have hereunto set my hand.

CHARLES W. KIRSCH.